United States Patent [19]

Buczek

[11] Patent Number: 4,566,788
[45] Date of Patent: Jan. 28, 1986

[54] DETECTOR ARRAY

[75] Inventor: Carl J. Buczek, Encinitas, Calif.

[73] Assignee: Ford Aerospace & Communications Corporation, Detroit, Mich.

[21] Appl. No.: 443,844

[22] Filed: Nov. 22, 1982

[51] Int. Cl.$^4$ .......................... G01C 3/08; H01J 40/14
[52] U.S. Cl. ....................................... 356/4; 250/208; 250/578; 250/209
[58] Field of Search ............ 356/1, 152, 4, 400; 250/342, 578, 332, 349, 334, 208, 209; 358/212

[56] References Cited

U.S. PATENT DOCUMENTS

| | | | |
|---|---|---|---|
| 3,555,285 | 1/1971 | Irving | 250/220 |
| 3,813,140 | 5/1974 | Knockeart | 350/7 |
| 4,178,098 | 12/1979 | Asano et al. | 356/1 |
| 4,246,480 | 1/1981 | Clark | 250/578 |
| 4,270,862 | 6/1981 | Hewitt | 356/5 |
| 4,310,227 | 1/1982 | Zinchuk | 354/25 |
| 4,337,395 | 6/1982 | Alexander et al. | 250/332 |

Primary Examiner—S. C. Buczinski
Assistant Examiner—Gregory C. Issing
Attorney, Agent, or Firm—Paul K. Godwin, Jr.; Robert D. Sanborn

[57] ABSTRACT

An improved detector array for scan receiver applications whereby each contiguous element of the array is connected to a summing port with its adjacent element.

15 Claims, 5 Drawing Figures

DETECTOR ARRAY

BACKGROUND OF THE INVENTION

1. Field of the Invention

The present invention is directed to the field of radiation detection and more specifically to the area of achieving improved resolution in detector arrays.

2. Description of the Prior Art

A conventional range finder system is shown in FIG. 1, wherein a source of collimated electromagnetic radiation 22, such as a laser, emits a beam that is projected and scanned over a field of view. The laser 22 in combination with the lens system 20, provides a collimated beam of a predetermined cross-section that is partially reflected by a polarized beam splitter 18 along the system axis $A_T$. The reflected polarized beam is rotated by a quarter wave plate 16 and directed towards a multi-faceted scanning mirror 14. Since the angle of incidence is continually changing due to the constant rotation of the scanning mirror 14, the resulting beam reflecting therefrom and the transmission axis $A'_T$ are repeatedly scanned across a defined linear path.

An elevation scanner 12 is located in the path of the linearly scanned beam from the scanning mirror 14 and provides an orthogonal scan vector to the beam as it is transmitted via an objective lens system 10. The resulting scan pattern is a raster type scan of a plurality of parallel line scans progressively swept over a field of view in an orthogonal direction controlled by the elevation scanner 12.

In the event a radiation reflective object (target) is located within the field of view, a portion of the transmitted beam incident thereon will be retroreflected towards the objective lens system 10. The received radiation (target return) is projected into the range finder system off-axis from the scanned transmission axis $A'_T$. The objective lens system 10 projects the received radiation through the elevation scanner 12 towards the scanning mirror 14. Since the scanning mirror 14 is being rotated at a relatively high rate, the received radiation will have a different incident angle with respect to the mirror 14 than when it was transmitted. The rate of rotation for the mirror 14 is constant. Therefore, the change of incidence angle is related to the delay between transmitted and reflected radiation being incident thereon and a direct function of the distance between the mirror 14 and the target.

The received radiation polarization is rotated by the quarterwave plate 16 so that it is polarized parallel to the plane of polarization to the polarized beam splitter 18. The received radiation passes through the polarized beam splitter 18 and is focused onto a detector array 30 by a lens 24. The detector array is disposed with respect to the lens 24 so as to correspond to the scanned focal point of the system that is line scanned with the rotation of the scanning mirror 14.

The individual elements of the detector array 30 are illustrated in FIG. 2, corresponding to the line scan and the predicted amount of angular offset for target returns throughout a range of target distance. Each element represents a separate range bin and is connected to a signal processor 40 that provides appropriate range information according to the particular elements or group of elements that are illuminated. The range is determined by the angular relationship of $\theta = \dot{\theta}(2R/C)$. In that relationship, $\theta$ is the angle of offset of a returned radiation from the optical axis reference $A_R$; $\dot{\theta}$ is the rate of scan of the optical axis $A_T$ contributed by the scanning mirror 14 rotating at the rate of $\dot{\theta}/2$; C is the speed of light; and R is the range of the reflecting object from the scanning mirror 14.

The individual range elements in the detector array 30 are characterized as having equal height and width measurements with the relationship of $1.6 \times \lambda/D$ resolution capability of the optics. In that relationship, $\lambda$ is the wavelength of the transmitted electromagnetic radiation and D is the aperture dimension of the objective lens 10.

The response characteristics of the conventional detector array are shown in FIG. 3 as a plot of the receiver relative signal power, for three adjacent elements "n−1", "n", and "n+1" representing separate range bin locations, versus the range of the target for an optimized return signal that would approximately cover the area of one range bin. From such a plot, it can be seen that the off-center performance for receiver relative signal power at the "n" detector drops to less than one-half (from 0.303 to 0.142) when the range is midway between range bins (detector elements). In addition, the receiver relative signal power at the "n" detector is decreased to a insignificant level (0.012) when the return signal is a full range bin interval away (e.g., at "n+1" or "n−1"). Accordingly, in that event, the signal-to-noise ratio at the "n" detector element would be 14 dB down with respect to the "n+1" or "n−1". Such a large drop in signal-to-noise ratios is undesirable since the interpolation accuracy for off-centered detections is greatly degraded.

SUMMARY OF THE INVENTION

The present invention provides an improved detector array and signal processing technique. In this invention, the size of each element along the direction of the array is decreased to one-half its height and each element is connected to a summing port in which the signal from each element is summed with that from its adjacent element. Therefore, when substituted for a conventional array, the target return radiation image is distributed over a larger number of elements and the resultant signals are summed coherently to provide greater range resolution.

DETAILED DESCRIPTION OF THE PREFERRED EMBODIMENT

Figure 4:
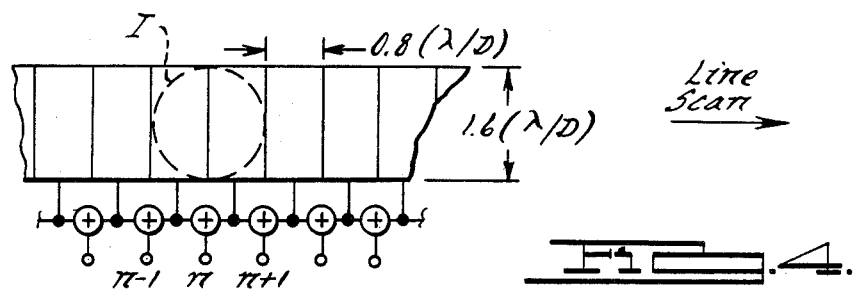
FIG. 4 is a diagrammatic view of the detector array of the present invention.
Figure 3:
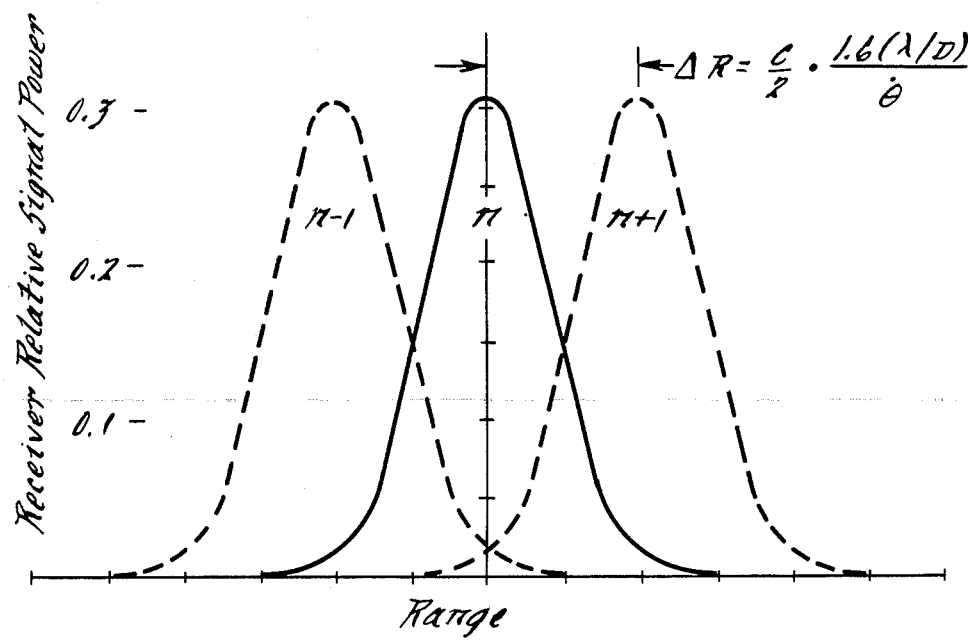
FIG. 3 is a graphical plot of the signal response of the system as shown in FIG. 1 employing the conventional detector array of FIG. 2.

The improved detector array, of the present invention as shown in FIG. 4, has a plurality of individual detector elements producing an electrical response according to the amount of electromagnetic radiation being directed thereto. The detector elements are contiguously disposed along a linear path that corresponds to the line scan of the focal point of an associated optical system, such as that shown in FIG. 1. Each detector element of the array is electrically connected to a summing port ( ... n−1; n; n+1; ... ) with its adjacent element.

Each detector element has an angular height dimension measured transverse to the direction of scan which is the same as the conventional array of elements of $1.6 \times (\lambda/D)$ and an angular width dimension measured parallel to the path of the array that is approximately $0.8 \times (\lambda/D)$—about one-half its transverse height dimension. Such an angular width dimension provides a maximum response for a return image I centered on a pair of elements.

Figure 5:
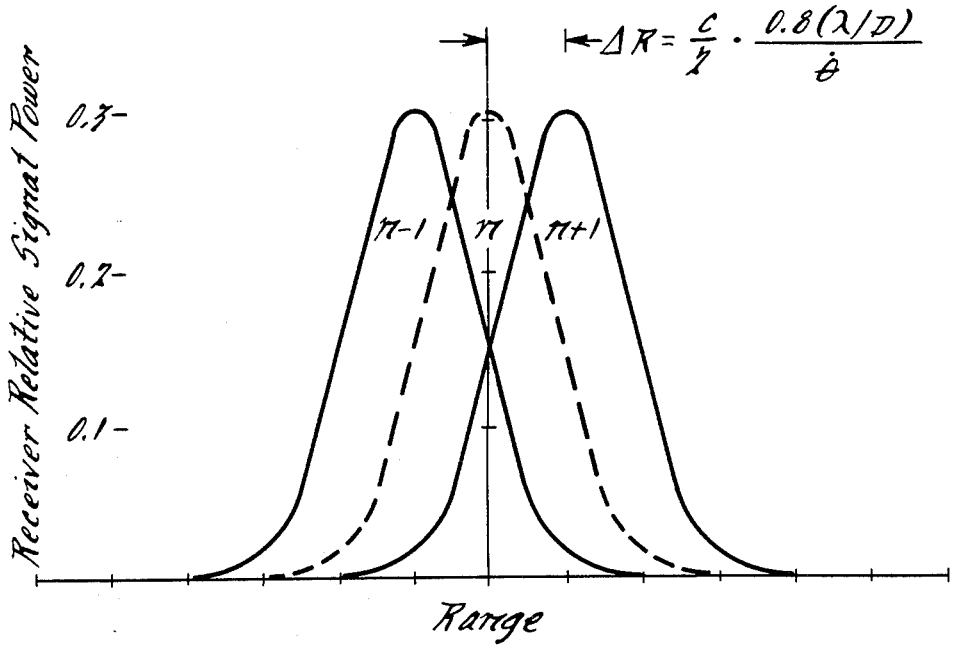
FIG. 5 is a graphical plot of the signal response of the present invention employed in a system similar to that shown in FIG. 1.

For an idealized target return image I, the substitution of the detector array of the present invention provides an improved range resolution, as can be seen in FIG. 5. In this configuration, the detector array of the present invention provides maximum drop in the off-center receiver relative signal power at the "n" summing port that is less than 1/5th (from 0.303 to 0.250) when the range is mid-way between range bins. In addition, the receiver relative signal power at the "n" summing port is decreased to only approximately one-half (0.150) when the return signal is centered a full range-bin interval away.

Figure 1:
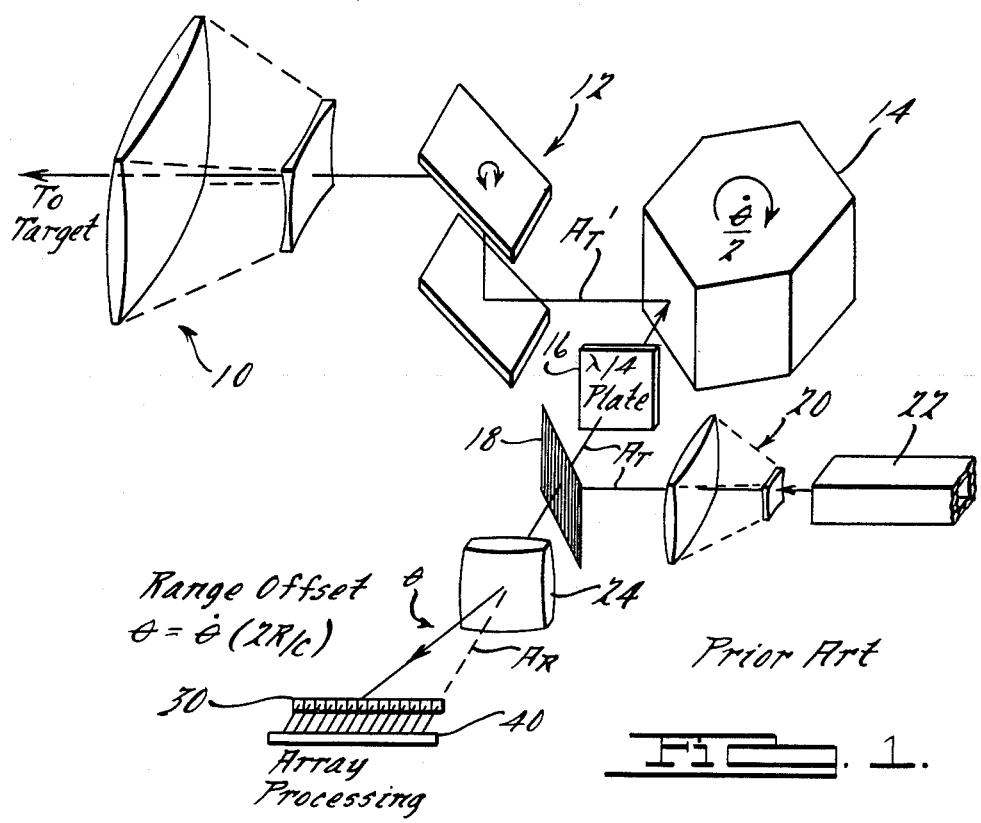
FIG. 1 is a conceptual illustration of a prior art range finder system employing a linear detector array.
Figure 2:
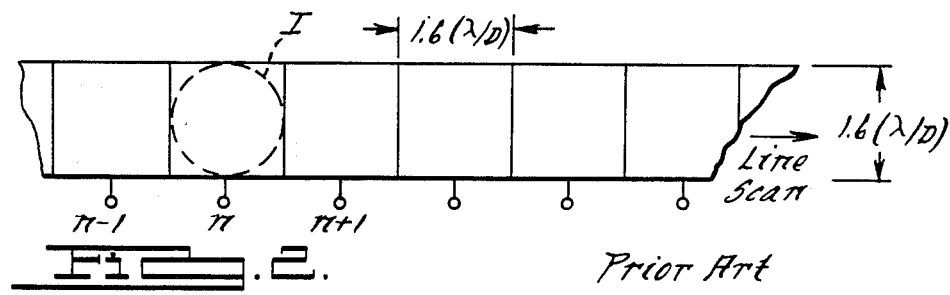
FIG. 2 is a diagrammatic view of a prior art linear detector array as conventionally used in the system shown in FIG. 1.

As a consequence, when the detector array of the present invention is employed in a range finder system as shown in FIG. 1, each range bin is separated by $(C/2) \, 0.8 \, (\lambda/D)/\theta$. The reduction in range bin size allows the rate of rotation for the mirror 14 to be reduced by one-half, thereby reducing wear and maintenance frequency for the system.

It will be apparent that may modifications and variations may be implemented without departing from the scope of the novel concept of this invention. Therefore, it is intended by the appended claims to cover all such modifications and variations which fall within the true spirit and scope of the invention.

I claim:

1. A detector array for sensing electromagnetic radiation of a predetermined wavelength directed thereto by an associated optical system including:
   a plurality of individual detector elements, in a contiguous arrangement, each producing an electrical charge in response to the amount of electromagnetic radiation being direct to said individual detector elements; and
   means for summing the electrical charge present on each detector element with the charge present on its immediately adjacent detector element and providing a summed output signal for each pair of adjacent elements.

2. A detector array as in claim 1, wherein said associated optical system includes means for scanning the focal point of said system along a predetermined path and said plurality of said individual detector elements are contiguously disposed along said path.

3. A detector array as in claim 2, wherein said predetermined scan path is linear.

4. A detector array as in claim 3, wherein said plurality of said detector elements are linearly disposed along a single line coincident with said path.

5. A detector array as in claim 4, wherein:
   said associated optical system has a radiation receiving aperture dimension defined as D;
   said predetermined wavelength is defined as $\lambda$; and
   each detector element has a dimension along said path measuring approximately $0.8 \, (\lambda/D)$ and a dimension normal to said path measuring approximately $1.6 \, (\lambda/D)$.

6. A detector array as in claim 1 wherein:
   said associated optical system is a range finder system including means for transmitting radiation at said predetermined wavelengths to a remote target; and
   means for linearly scanning said transmitted radiation over a field of view, wherein said means for transmitting and scanning also function to receive transmitted radiation retroreflected from a remote target.

7. A detector array as in claim 6, wherein said scanning means includes a multi-faceted wheel rotating at a predetermined rate.

8. A detector array as in claim 2 wherein
   said associated optical system is a range finder system including means for transmitting radiation at said predetermined wavelengths to a remote target; and
   means for linearly scanning said transmitted radiation over a field of view, wherein said means for transmitting and scanning also function to receive transmitted radiation retroreflected from a remote target.

9. A detector array as in claim 8, wherein said scanning means includes a multi-faceted wheel rotating at a predetermined rate.

10. A detector array as in claim 3 wherein:
    said associated optical system is a range finder system including means for transmitting radiation at said predetermined wavelengths to a remote target; and
    means for linearly scanning said transmitted radiation over a field of view, wherein said means for transmitting and scanning also function to receive transmitted radiation retroreflected from a remote target.

11. A detector array as in claim 10, wherein said scanning means includes a multi-faceted wheel rotating at a predetermined rate.

12. A detector array as in claim 4 wherein:
    said associated optical system is a range finder system including means for transmitting radiation at said predetermined wavelengths to a remote target; and
    means for linearly scanning said transmitted radiation over a field of view, wherein said means for transmitting and scanning also function to receive transmitted radiation retroreflected from a remote target.

13. A detector array as in claim 12, wherein said scanning means includes a multi-faceted wheel rotating at a predetermined rate.

14. A detector array as in claim 5, wherein:
    said associated optical system is a range finder system including means for transmitting radiation at said predetermined wavelengths to a remote target; and
    means for linearly scanning said transmitted radiation over a field of view, wherein said means for transmitting and scanning also function to receive transmitted radiation retroreflected from a remote target.

15. A detector array as in claim 14, wherein said scanning means includes a multi-faceted wheel rotating at a predetermined rate.

* * * * *